(No Model.)
J. A. MITCHELL.
FENCE STAY MACHINE.
No. 561,122. Patented June 2, 1896.
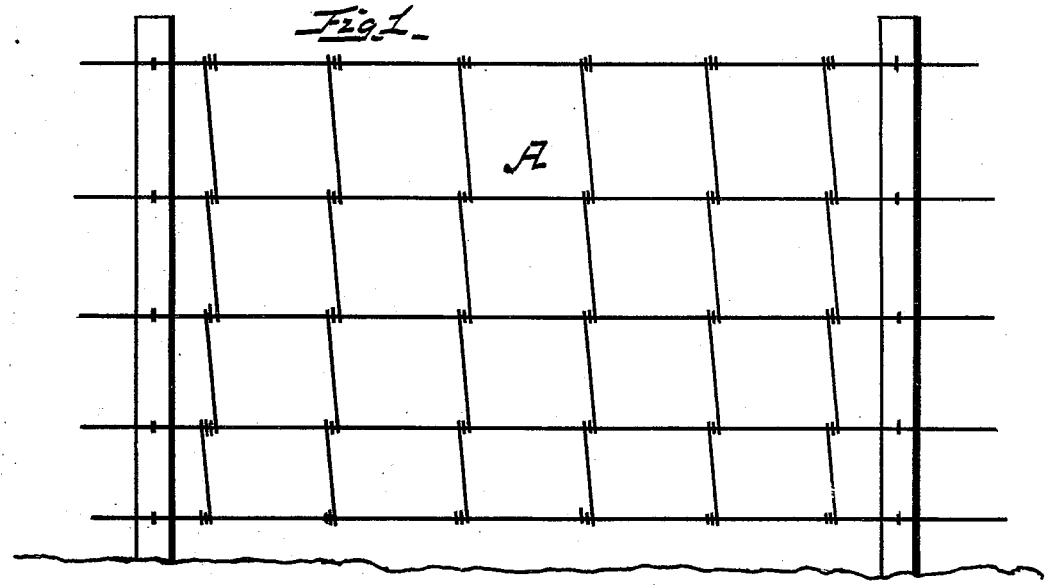
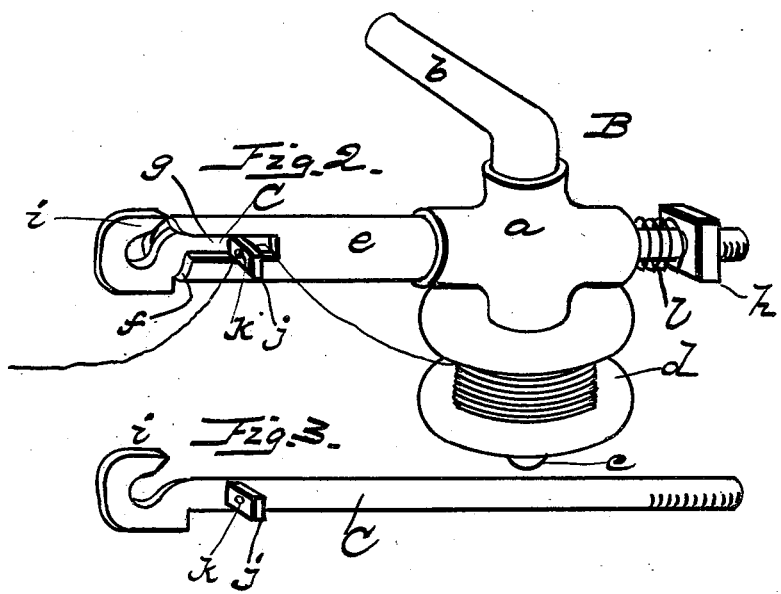
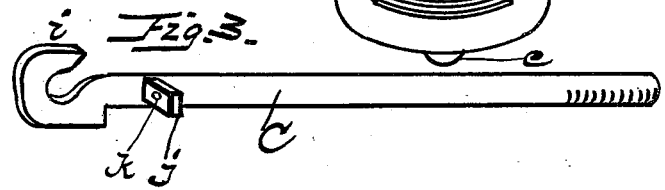
WITNESSES
Jas. B. Clarke
M. M. Morris
INVENTOR
James A. Mitchell
by E. H. Bates, Attorney

UNITED STATES PATENT OFFICE.

JAMES A. MITCHELL, OF WARREN, INDIANA.

FENCE-STAY MACHINE.

SPECIFICATION forming part of Letters Patent No. 561,122, dated June 2, 1896.

Application filed March 18, 1896. Serial No. 583,704. (No model.)

*To all whom it may concern:*

Be it known that I, JAMES A. MITCHELL, a citizen of the United States, residing at Warren, in the county of Huntington and State of Indiana, have invented certain new and useful Improvements in Fence-Stay Machines; and I do hereby declare the following to be a full, clear, and exact description of the invention, such as will enable others skilled in the art to which it appertains to make and use the same.

This invention has relation to improvements in devices for building and bracing wire fences; and it consists in the novel construction and arrangement of a portable hand-tool for wrapping and tying stay-wires to the horizontal wires of a plain or barbed wire fence, all as will be hereinafter more fully explained.

The annexed drawings, to which reference is made, fully illustrate my invention, in which—

Figure 1 represents a section of a wire fence, showing the brace-wires attached thereto. Fig. 2 is a perspective view of the hand-tool, and Fig. 3 is a perspective view of the hook detached from the main portion of the tool.

Referring by letter to the accompanying drawings, A designates a section of a wire fence, showing the brace-wires in position upon the horizontal wires thereof.

B represents the tool or implement by which these stay-wires are secured in place. This implement consists of the main body portion $a$, having a handle $b$ on one side and a short arm $c$ on the opposite side to carry a spool $d$, upon which the stay-wire is wound. Extending from the main body of the tool is a tube $e$, open at its end $f$ and provided with a slot $g$, for a purpose hereinafter explained.

C indicates a rod which passes through the tube and also through the main body. At one end the same is screw-threaded to receive a nut $h$, while the opposite end forms a hook $i$, and a lug $j$ extends at right angles thereto, having a perforation $k$, through which the wire from the spool passes. A coiled spring $l$ is placed upon the rod and interposed between the nut and the main body.

In using my device the operator passes the end of the bracing-wire through the perforation or eye in the lug and secures said end to the first horizontal wire of the fence, where it is twisted around the same, after which the tool is carried to the next wire, the hook grasping the same and the tool carried around until the desired number of twists are given the brace-wire, when the nut is pressed upon, releasing the hook from the end of the tube, and the hook withdrawn from the horizontal wire, when the same operation is repeated until the horizontal wires are firmly braced by the bracing-wires. In this operation it will be seen that the spool is constantly paying out the bracing-wire therefrom, and when the hook is on the horizontal wire the pressure of the spring upon the nut causes a close contact between the end of the tube and said hook. In releasing the hook from the horizontal wire the operator simply presses upon the nut, forcing the hooked rod forward. The lug on the rod plays in the slot of the tube, and thereby the rod is prevented from turning.

It will be observed from the above description, when taken in connection with the annexed drawings, that my device can be readily attached and detached from the line-wires of a barbed or plain wire fence and the stay-wires quickly applied thereto, and it is simple in operation, durable, and at the same time cheap to manufacture.

Having thus described my invention, what I claim, and desire to secure by Letters Patent, is—

1. A hand implement for securing stay-wires to line-wires of a wire fence comprising the main body portion, a tube extending therefrom and provided with the handle and short arm, and a spool on said arm, a rod having at one end the hook and a lug projecting at right angles thereto having an eye therein, and a coiled spring surrounding said rod and interposed between a nut and the main body of the implement, all substantially as described.

2. In combination with the main body portion provided with the handle and extension-tube, of the spool mounted on the short arm, the rod having the hooked end, and lug having an eye; the spring surrounding said rod, and the nut on the end thereof, said lug adapted to have its sliding movement in the slot of the tube, all substantially as and for the purpose specified.

In testimony whereof I affix my signature in presence of two witnesses.

JAMES A. MITCHELL.

Witnesses:
CHARLES WUERSTEN,
LEVI L. SIMONS.